United States Patent Office 3,387,089
Patented June 4, 1968

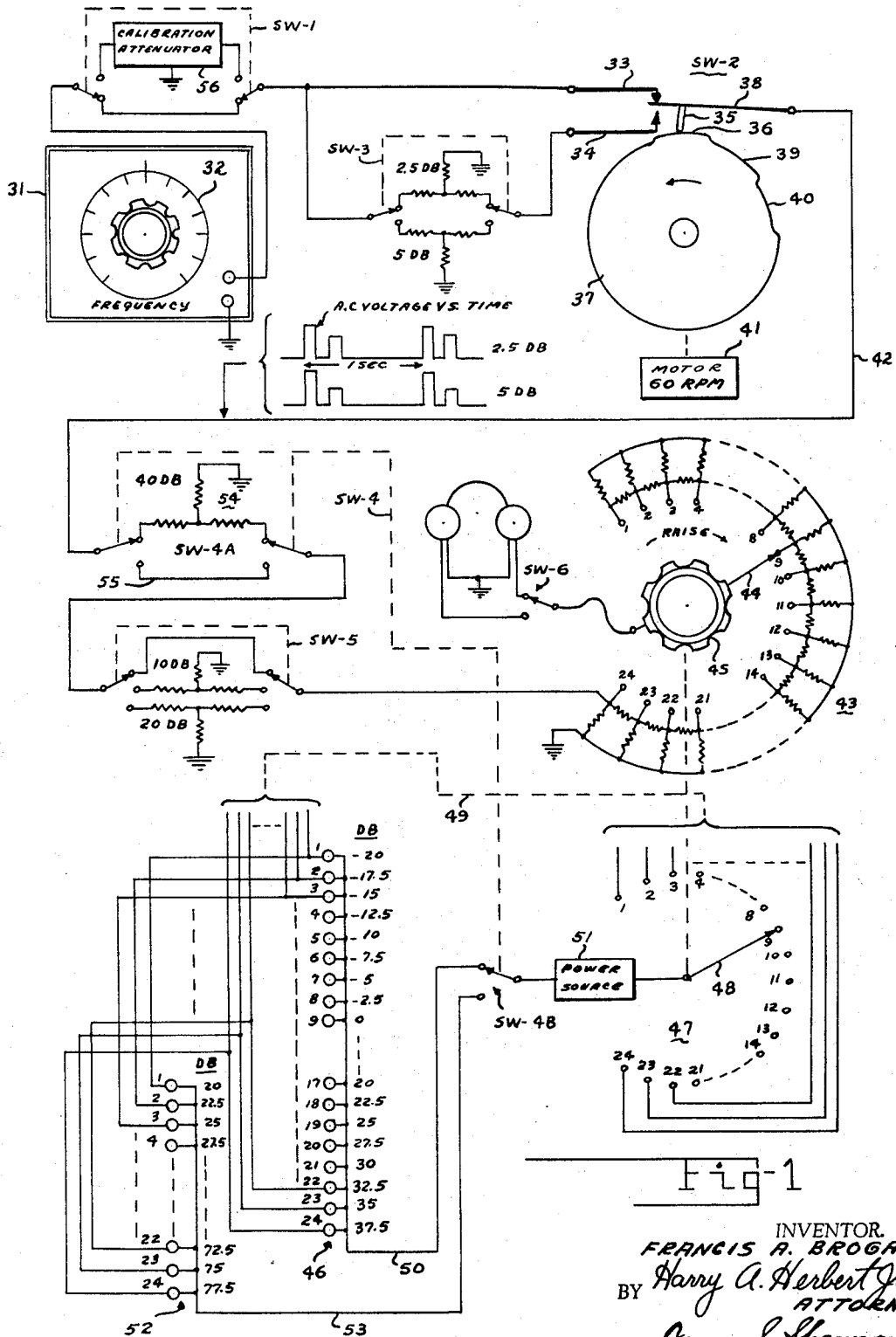

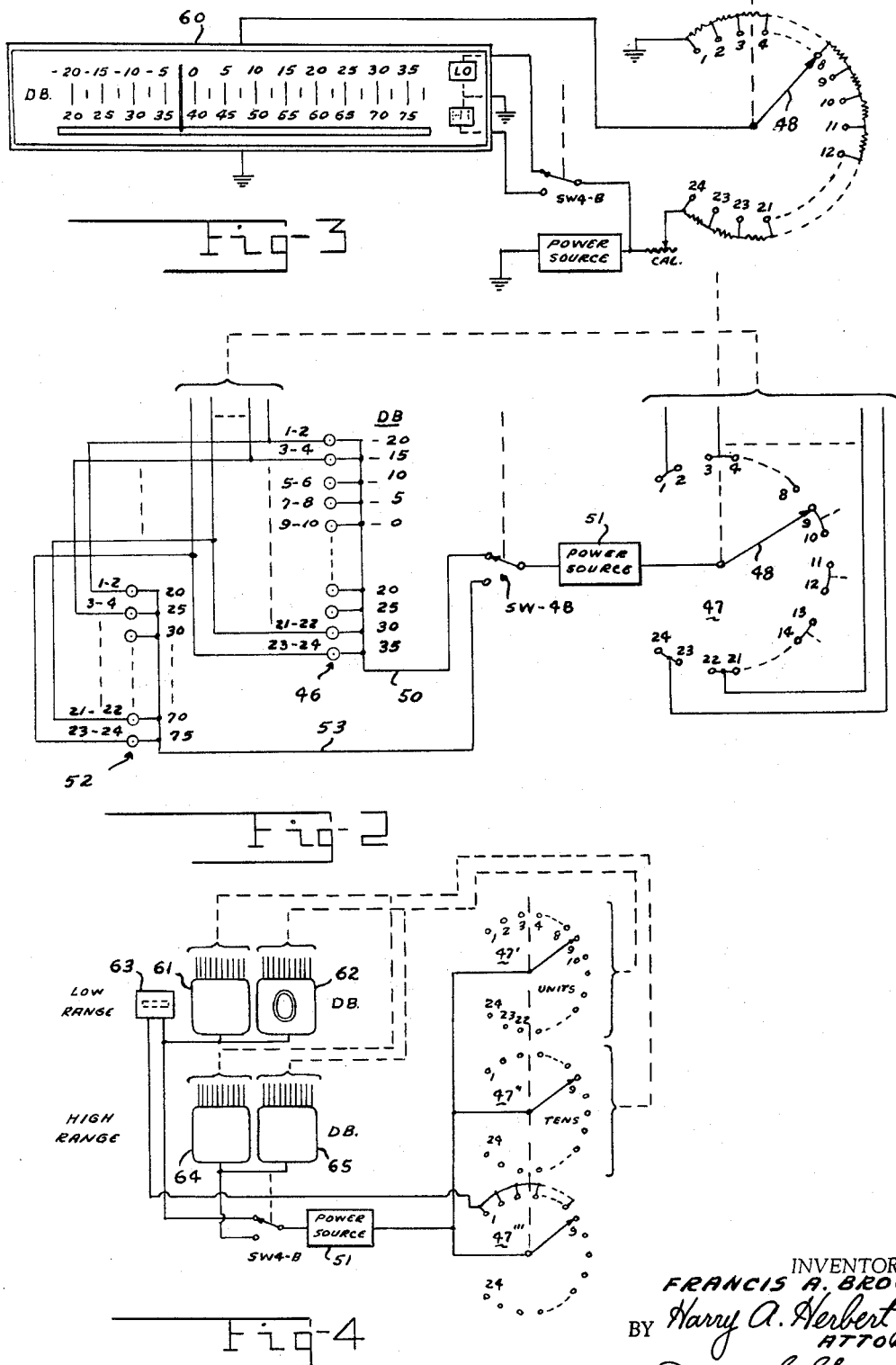

3,387,089
AUDIOMETRIC METHOD AND APPARATUS
Francis A. Brogan, 433 Brees Blvd.,
San Antonio, Tex. 78209
Filed Mar. 23, 1965, Ser. No. 442,216
8 Claims. (Cl. 179—1)

ABSTRACT OF THE DISCLOSURE

Audiometric method and apparatus in which the subject receives periodically a pair of equal duration time spaced pulses of sound of the same audio frequency but having levels differing by from 2.5 to 5 db, and is instructed to reduce the sound level by means of a calibrated attenuator until only one pulse is heard. The attenuator setting at which only one pulse is heard is taken as the subject's threshold at that frequency. Provision is also made for a dual range attenuator and coupled dual range remote indicator of attenuator position.

---

The invention described herein may be manufactured and used by or for the United States Government for governmental purposes without the payment to me of any royalty thereon.

This invention relates to audiometry or the measurement of a subject's hearing ability relative to what is considered normal hearing. Its principal purpose is to improve the accuracy of such tests, particularly for persons afflicted with tinnitus or a ringing sensation in the ear. Other objects are to provide a simplified test method and apparatus in which the subject may determine his own threshold of hearing, in which the time required to complete the test is not fixed but dependent upon the individual's skill, and in which improved means are provided to clearly display the subject's threshold at each frequency either to the subject or to an operator.

Previous audiometric techniques required the subject to lower the level of a continuous tone and to signal when the tone become inaudible. If the subject has tinnitus the signal will often be delayed thus indicating a lower threshold than the true value. In accordance with the invention the subject receives periodically a pair of successive equal duration time spaced pulses of sound of the same audio frequency but having levels differing by from 2.5 to 5 db, and is instructed to reduce the sound level until only one pulse is heard. The level at which only one pulse is heard is taken as the subject's threshold at that frequency.

The level is controlled by a manually operated stepped attenuator having equal attenuation between steps. An intermediate step is chosen as the reference or 0 db level and the sound intensity is adjusted with the attenuator on this step to be at the threshold of hearing for the normal ear. With this arrangement steps of greater attenuation than that at the 0 db step represent thresholds below normal and steps of less attenuation than that at the 0 db step represent thresholds higher than normal.

In order to readily display the setting of the attenuator and hence the threshold in a manner that can be made visible to the subject for self-testing or visible only to an operator as desired, there is provided, in accordance with the invention, a preferably vertical panel having a vertical row of indicator lamps in a one-to-one correspondence with the steps of the attenuator. An extra bank of contacts on the attenuator step switch is wired to the lamps and serves to energize the lamp corresponding to the step on which the attenuator is set. Each lamp is marked to indicate the level in decibels above or below 0 db, the normal hearing threshold. This arrangement may be modified to provide a dual range audiometer and display by adding a second row of indicator lamps identical to the first which are also connected to the extra bank of attenuator contacts. In this case, a fixed attenuator, having an attenuation less than the total attenuation of the step attenuator by the amount of the desired overlap of the two ranges, is connected in series with the step attenuator by a two position range switch set in its low range position, in which position it also connects the lamps of the first row for energization through the extra bank of contacts on the attenuator step switch. The audio energization is set with the audiometer in low range so that the sound level produced with the attenuator at the 0 db step corresponds as before to the threshold of the normal ear. Changing the range switch to the high range position removes the fixed attenuator from the circuit and connects the second row of lamps for energization through the extra bank of contacts on the attenuator step switch. The lamps of the second row are marked to read levels that are above the levels of the corresponding lamps of the first row by the amount of attenuation introduced by the fixed attenuator expressed in decibels.

Other indicators such as electrical meters or numerical indicator tubes may also be used.

A more detailed description of the invention will be given with reference to the specific embodiments thereof shown in the accompanying drawings in which FIG. 1 is a schematic diagram of a dual range audiometer in accordance with the invention in which the thresholds are displayed in 2.5 db steps, FIG. 2 is a modification of FIG. 1 in which the threshold display is in 5 db steps, and FIGS. 3 and 4 show other threshold displays.

Referring to FIG. 1, the element 31 represents any suitable source of test audio frequencies suitable for audiometry. It may be constructed as part of the audiometer to be described or it may be the audio frequency source of a commercial audiometer. Such sources consist basically of an audio frequency oscillator which may be set by dial 32 to any of a plurality of discrete test frequencies distributed over the audio range, together with means for adjusting the level of each test frequency so that, with the audiometer level adjusted to the position representing the threshold of the normal ear, the sound level at the earphone is at the threshold of the normal ear for that frequency. The level adjusting arrangement usually consists of a separate potentiometer for each frequency with a switch operated from the frequency dial for selecting the potentiometer corresponding the particular frequency, or an equivalent arrangement. The construction of such calibrated audio frequency sources need not be described in more detail here since it is well known in the art, an example being U.S. Patent 3,054,855 to Hyman.

The output of audio frequency source 31 is applied to two-position switch SW–1 in one position of which a calibration attenuator, to be explained later, is connected in the circuit and in the other of which a direct connection is established through the switch. The output of SW–1 is applied directly to contact 33 of switch SW–2 and also through either a 2.5 db attenuator or a 5 db attenuator, depending upon the position of SW–3, to contact 34 of SW–2.

SW–2 is cam operated so that with cam follower 35 on the high level 36 of cam 37 contacts 33–38 are closed and contacts 34–38 are open, on the intermediate level 39 both sets of contacts are open and on the low level 40 contacts 33–38 are open and contacts 34–38 closed. In the example shown, the three cam sections 36, 39 and 40 are given equal angular extents of about 36° and cam 37 is driven at one revolution per second by constant speed 60 r.p.m. motor 41. With this arrangement there is produced on line 42 a pair of successive pulses of audio frequency voltage having equal durations equal to their separation interval of about 0.1 second, with the pulses of their pair differing in level by 2.5 db or 5 db depending upon the position of SW-3 and with the pulse pair being periodically repeated at 1 second intervals. This is illustrated by the waveforms given which show the A.C. audio frequency voltage variation with time. The repetition rate of the pulse pairs, the pulse durations and the pulse separation interval are all matters of choice which may be controlled by the design parameters, i.e. the cam speed, the number of repetitions of the cam surfaces on the cam and the actual and relative angular extents of the cam surfaces.

The audio signal on line 42 is applied through range switch SW-4 and test verification switch SW-5 to the input of a step attenuator 43 having twenty-four contacts. In the example shown, the attenuation between contacts is 2.5 db. Accordingly, the total attenuation at contact 24 is 0 db and the total attenuation at contact 1 is 57.5 db. The level of audio frequency energization applied to the right or left earphone through earphone selecting switch SW-6 is determined by the position of movable contact 44 which is manually controllable by knob 45, a clockwise rotation of knob 45 causing an increase in the energization level at the headphones. As will be explained more fully in describing the calibration of the instrument, an intermediate point on the attenuator, for example contact 9, is selected as the 0 db level point and, with the attenuator set at this step, the audio energization of the instrument from source 31 is so set that the sound level at the earphone equals the threshold of the normal ear. Therefore, settings of contact 44 to steps clockwise of contact 9 indicate hearing thresholds higher than normal or a poorer than average hearing ability and settings counterclockwise of contact 9 indicate hearing thresholds lower than normal or a better than average hearing ability.

The attenuator 43 is preferably unmarked. In order to indicate its position a separate indicator is provided which may be coupled to the remainder of the instrument by a flexible cable. With this arrangement the indicator may be made visible only to the person administering the test or it may be made visible to the subject for self-testing. The indicator comprises any suitable preferably vertical panel (not shown) having a vertical row of twenty-four indicator lamps 46 in a one-to-one correspondence with the twenty-four steps of attenuator 43. The attenuator step switch is provided with an additional bank 47 of twenty-four stationary contacts, corresponding to the twenty-four contacts of the attenuator, and with a movable contact 48 mechanically coupled to the movable contact 44 of the attenuator. The contacts of bank 47 are connected through cable 49 to the corresponding indicator lamps. A common connection 50, which may also be located in cable 49, returns the lamp circuits through the upper contact of section SW-4B of range switch SW-4 and lamp power source 51 to contact 48. In order to extend the range of the indicator a second row 52 of twenty-four indicator lamps is provided. These lamps, like the lamps in row 46 are also connected to the contacts of switch bank 47, and have a common connection 53, which may also be located in cable 49, connecting them through the lower contact of SW-4B and source 51 to contact 48.

The upper position of range switch SW-4, as seen in the drawing, is the low range position. In this position a fixed attenuator 54 is connected between line 42 and the input to attenuator 43. In the lower or high range position this attenuator is replaced by a direct connection 55. The amount of attenuation introduced by attenuator 54 may have any value equal to or less than the total attenuation of attenuator 43, depending upon the amount of overlap of the high and low ranges desired in the indicator. In the example given, network 54 introduces an attenuation of 40 db. Therefore, as apparent from the drawing, changing SW-4 from low to high range increases the level of audio energization at the input to attenuator 43 by 40 db. At the same time it de-energizes the row 46 of low range indicator lamps and energizes row 52 of high range indicator lamps.

As stated earlier, an intermediate point on attenuator 43 such as contact 9 is designated the 0 db sound level point. With contact 44 on this point and SW-4 in its low range position, the audio frequency energization of the system is made such that the sound level at the earphone corresponds to the hearing threshold of the normal ear. Therefore, lamp 9 in low range row 46 of the indicator is marked 0 db and corresponds to the normal hearing threshold, while lamps 1-8 are marked in levels below the normal threshold, as indicated by the negative signs, and lamps 10-24 are marked in levels above normal threshold. The lamps in the high range row 52, which are energized when SW-4 is in its high range or lower position, are marked in levels that are above the level markings of the corresponding lamps in the low range row 46 by the amount of the attenuation introduced by attenuator 54, in this case 40 db. Therefore the low range of sound levels extends from −20 db to 37.5 db and the high range extends from 20 db to 77.5 db, there being a 17 db overlap in the two ranges. This overlay may be increased or decreased as desired by decreasing or increasing the fixed attenuation introduced by attenuator 54.

Where the testing accuracy does not require 2.5 db steps, the apparatus of FIG. 1 may be converted to 5 db steps by the modification illustrated in FIG. 2. In this case only half the number of lamps are required in each indicator row. SW-3 may be placed in its 5 db position with this arrangement.

Considering now the operation and calibration of the described audiometer, when attenuator 43 is set to a position where both pulses of the tone pulse pair exceed the subject's hearing threshold both pulses are heard. As attenuator 43 is rotated counterclockwise the pulse levels are reduced until eventually, when the weaker pulse level is below the subject's threshold, only one tone pulse is heard. Continued counterclockwise rotation finally lowers the stronger of the two pulses below the subject's threshold and neither pulse is heard. The spread between the first and last event depends upon the difference in the levels of the two pulses, the spread decreasing as the level difference is decreased. Ideally, the spread is made small enough by properly relating the pulse level difference and the magnitude of the attenuator step that a single pulse will be heard at only one position of the attenuator, this position indicating the subject's hearing threshold at the particular test frequency.

When the attenuator 43 is adjusted to the position where only one pulse of the pulse pair is heard the subject's threshold lies below the sound level produced at the earphone by the stronger pulse and above the sound level produced by the weaker pulse. Therefore, when calibrating the instrument, it is preferable to reduce the pulse levels below their operating levels by half the difference in level between the stronger pulse and the weaker pulse. For example, for a pulse difference of 2.5 db, the instrument should be calibrated with the pulse levels reduced 1.25 db. To provide for this reduction in level during calibration, switch SW-1 in its upper or calibrate position connects an attenuator 56 between the output of audio frequency energy source 31 and the input to the pulse pair generator. As indicated above, the attenuation produced by element 56 should be half the difference between the stronger and weaker pulse levels, or 1.25 db for a 2.5 db difference.

The complete calibration procedure is as follows: (1) SW-1 is placed in its upper or calibrate position; (2) contacts 33-38 of SW-2 are held closed and contacts 34-38 held open by any suitable means, for example, cam 37 may be stopped with the follower 35 on the high level 36; (3) SW–4 is placed in its upper or low range position; and (4) movable contact 44 of attenuator 43 is placed on contact 9 as evidenced by the energization of the 0 db lamp in low range row 46 of the indicator. The output of audio frequency energy source 31 is then adjusted at each test frequency to make the sound level at the earphone correspond to the threshold of the normal ear at that frequency.

To use the audiometer for testing, SW–1 is returned to its lower or operate position and SW–2 is placed in normal operation. If the subject does not hear both pulses of the pair, attenuator 43 is rotated clockwise by knob 45 until both pulses are heard. Knob 45 is then rotated counterclockwise until only one pulse of the pulse pair is heard. The energized lamp in row 46 of the indicator then shows the subject's threshold at the particular test frequency. If both pulses cannot be heard even in the extreme clockwise position, SW–4 is switched to the lower or high range position and knob 45 rotated counterclockwise until only one pulse is heard. The threshold may then be read from the high range row of lamps 52 of the indicator.

Switch SW–5 is provided to verify the test results at any frequency. Should the subject be suspected of cheating by counting the attenuator 43 detent clicks and stopping at a position indicating a lower threshold than his true threshold, a known fixed amount of attenuation, such as 10 db or 20 db, may be inserted by this switch and the subject retested at the same frequency. If the subject than sets the attenuator 43 to a correspondingly higher threshold it may be assumed that the original result was valid.

In the described embodiment the stronger of the two pulses in the pulse pair is shown as occurring first and this is the preferred arrangement. However, if desired, the weaker pulse may be made to occur first by reversing the leads to contacts 33 and 34 of SW–2.

The invention is not limited to the mechanically actuated switch method shown in FIG. 1 for generating the tone pulse pairs. Other methods of accomplishing the same result will readily occur to those skilled in the art. For example, internal oscillator keying and electronic switching are techniques that may be employed for this purpose.

Also, other methods of remotely displaying the setting of attenuator 43, and thereby the hearing threshold, may be used. For example, in FIG. 3, switch bank 47 has equal resistors connected between contacts to form an equal-step potentiometer. A high impedance meter 60 is then connected between movable contact 48 and stationary contact 1 to indicate the stationary contact to which the attenuator is set. The meter has two scales marked in decibels to correspond to the attenuator positions. SW–4B may be used in this case to energize LO and HI range indicator lamps in the meter.

FIG. 4 shows another arrangement for remotely indicating the hearing threshold which employs commercially available numerical indicator tubes such, for example, as the NIXIE tubes manufactured by the Burroughs Corporation. In this arrangement, numerical indicator tubes 61 and 62 together with negative sign indicator 63 provide the low range threshold indications and numerical indicator tubes 64 and 65 provide the high range indications. Each of these tubes has ten control lines, one for each of the digits 0–9, and attenuator 43 (FIG. 1) is provided with three additional banks 47′, 47″ and 47‴. The control lines of units tubes 62 and 65 are connected to the contacts of units switch bank 47′ in such manner as to display the proper units digit in each range for each of the twenty-four positions of attenuator 43. Similarly, the control lines of tens tubes 61 and 64 are connected to tens switch bank 47″ in such manner as to display the proper tens digit in each range for each of the twenty-four attenuator positions. Switch bank 47‴ controls the negative sign indicator lamp 63 which is energized in the 1–8 positions of the low range only. The apparatus is shown in the 0 db position. As illustrated, only integers are displayed, i.e., if used in the system of FIG. 1, the 4 position for example, which corresponds to −12.5 db, would be displayed as −12 db. If desired, the 0.5 db values may be displayed by an additional numerical indicator positioned to the right of the units indicator for each range and an additional switch bank which energizes the 5 circuits of the tubes in each of the even numbered positions of the attenuator.

I claim:

1. An audiometer comprising: means for periodically producing a pair of equal duration time spaced pulses of audio frequency energy of the same adjustable audio frequency and different energy levels of fixed ratio, the time spacing being less than the repetition period of the pulse pair, an adjustable calibrated attenuator having an input and an output, means for applying said pulse pairs to the input of said attenuator, and means coupled to the output of said attenuator for applying the attenuator output energy to the ear as sound, the said fixed ratio of the energy levels of the pulses of said pair being such that at the ear when the stronger is slightly above the threshold of audibility the weaker is slightly below the threshold.

2. An audiometer comprising: means for periodically producing a pair of equal duration time spaced pulses of audio frequency energy of the same adjustable audio frequency and different energy levels of fixed ratio, the time spacing being less than the repetition period of the pulse pair, an adjustable calibrated attenuator having an input and an output, means for applying said pulse pairs to the input of said attenuator, and an earphone coupled to the output of said attenuator, the said fixed ratio of the energy levels of the pulses of said pair being such that at said earphone when the stronger is just above the threshold of audibility the weaker is just below the threshold.

3. An audiometer comprising: an adjustable calibrated equal step attenuator having an input and an output; means for periodically producing a pair of time spaced pulses of electrical energy of the same adjustable audio frequency with the repetition period being greater than the time spacing, said pulses having a magnitude ratio substantially equal to the attenuation ratio of each step of said attenuator; means for applying said pulse pairs to the input of said attenuator; and an earphone coupled to the output of said attenuator.

4. An audiometer comprising: a calibrated equal step manually adjustable unmarked attenuator having an input and an output; means for periodically producing a pair of time spaced pulses of electrical energy of the same adjustable audio frequency with the repetition period being greater than the time spacing, said pulses having a magnitude ratio substantially equal to the attenuation ratio of each step of said attenuator; means for applying said pulse pairs to the input of said attenuator; and hearing threshold indicator having an indicator lamp for each step of said attenuator; means coupled to the manual adjustment of said attenuator and to said lamps of energizing the lamp corresponding to the step to which the attenuator is adjusted; and an earphone coupled to the output of said attenuator.

5. An audiometer comprising: a source of audio frequency energy adjustable in frequency; an adjustable calibrated equal step attenuator; an attenuator having a fixed value of attenuation substantially equal to the attenuation of each step of said adjustable attenuator; a pair of normally open switches, one connected between said audio frequency source and the input to said adjustable attenuator and the other connected in series with said fixed attenuator between said audio frequency source and said adjustable attenuator input; means for periodically closing said switches in succession for equal short time spaced intervals; and an earphone connected to the output of said adjustable attenuator.

6. An audiometer comprising: a source of audio frequency energy adjustable in frequency; a calibrated equal step manually adjustable unmarked attenuator; an attenuator having a fixed value of attenuation substantially equal to the attenuation of each step of said adjustable attenuator; a pair of normally open switches, one connected between said audio frequency source and the input to said adjustable attenuator and the other connected in series with said fixed attenuator between said audio frequency source and said input to the adjustable attenuator; means for periodically closing said switches in succession for equal short time spaced intervals; a hearing threshold indicator having a low range indicator lamp group and a high range indicator lamp group, each group having an indicator lamp for each step of said adjustable attenuator; a two-section range switch having a high range position and a low range position; a lamp power source; a multi-position switch actuated by the manual adjustment of said adjustable attenuator for connecting the lamp in each group corresponding to the step on which said adjustable attenuator is set to one terminal of said power source; means connecting the other terminal of said power source through one section of said range switch to a common connection to all lamps in the low range group in the low range position of said range switch and to a common connection to all lamps in the high range group in the high range position; an additional attenuator having a fixed value of attenuation not greater than the total attenuation of said adjustable attenuator, the other section of said range switch serving to connect said additional attenuator between said audio frequency energy source and said adjustable attenuator in the low range position of the range switch and to remove said additional attenuator from the circuit in the high range position; and an earphone coupled to the output of said adjustable attenuator.

7. A method for determining hearing threshold comprising the steps of applying to the ear of a test subject a periodically repeated pair of equal duration time spaced pulses of sound of the same frequency, said pulses having slightly different levels in a fixed ratio, and equally reducing the levels of said pulses from levels at which both pulses are heard to levels at which only one pulse is heard, the subject's threshold being considered to lie between the pulse levels when only one pulse is heard.

8. An audiometer comprising: a calibrated equal step manually adjustable unmarked attenuator having an input and an output; means for periodically producing a pair of time spaced pulses of electrical energy of the same adjustable audio frequency with the repetition period being greater than the time spacing, said pulses having a magnitude ratio substantially equal to the attenuation ratio of each step of said attenuator; means for applying said pulse pairs to the input of said attenuator; a hearing threshold indicator coupled to the manual adjustment of said attenuator and actuated thereby for indicating the step to which said attenuator is adjusted; and an earphone coupled to the output of said attenuator.

References Cited

UNITED STATES PATENTS

| | | | |
|---|---|---|---|
| 2,537,911 | 1/1951 | Reger | 179—1.7 |
| 2,781,416 | 2/1957 | Brogan | 179—1.7 |
| 3,007,002 | 10/1961 | Du Vall | 179—1.7 |
| 3,221,100 | 11/1965 | Towne | 179—1.7 |

KATHLEEN H. CLAFFY, *Primary Examiner.*

R. P. TAYLOR, *Assistant Examiner.*